US012810341B2

(12) United States Patent
Shah et al.

(10) Patent No.: US 12,810,341 B2
(45) Date of Patent: Nov. 24, 2026

(54) CART WITH PHYSICAL SENSOR TO DETECT ITEM REMOVAL AND GENERATE USER INTERFACE WITH ALTERNATIVE OPTION

(71) Applicant: Maplebear Inc., San Francisco, CA (US)

(72) Inventors: Naval Shah, Toronto (CA); Charles Wesley, San Diego, CA (US); Brent Scheibelhut, Toronto (CA); Mark Oberemk, Toronto (CA)

(73) Assignee: Maplebear Inc., San Francisco, CA (US)

( * ) Notice: Subject to any disclaimer, the term of this patent is extended or adjusted under 35 U.S.C. 154(b) by 96 days.

(21) Appl. No.: 18/927,655

(22) Filed: Oct. 25, 2024

(65) Prior Publication Data

US 2026/0120164 A1 Apr. 30, 2026

(51) Int. Cl.
*G06Q 30/0601* (2023.01)

(52) U.S. Cl.
CPC ..... *G06Q 30/0631* (2013.01); *G06Q 30/0633* (2013.01); *G06Q 30/0641* (2013.01)

(58) Field of Classification Search
CPC .................................................. G06F 21/6254
See application file for complete search history.

(56) References Cited

U.S. PATENT DOCUMENTS 8,266,014 B1 * 9/2012 Bhosle ............... G06Q 30/0278 705/26.7
8,364,559 B1 * 1/2013 Bhosle .................. G06Q 30/00 705/26.63
11,734,747 B2 * 8/2023 Zielnicki ............ G06Q 30/0631 705/26.7
12,417,465 B1 * 9/2025 Scheibelhut ....... G06Q 30/0206
12,548,062 B2 * 2/2026 Balasubramanian .... G06N 3/08
12,561,725 B2 * 2/2026 McColeman ...... G06Q 30/0201
12,614,222 B2 * 4/2026 Scheibelhut ........... G06N 20/00
2024/0403938 A1 * 12/2024 Drerup ............... G06Q 30/0631
2025/0124482 A1 * 4/2025 Abutbul ................. G06Q 30/02
2025/0124486 A1 * 4/2025 Weill ................. G06Q 30/0635
2026/0065253 A1 * 3/2026 Scheibelhut ......... G06Q 20/208

OTHER PUBLICATIONS

K. Wickramaratna, M. Kubat and K. Premaratne, "Predicting Missing Items in Shopping Carts," in IEEE Transactions on Knowledge and Data Engineering, vol. 21, No. 7, pp. 985-998, Jul. 2009, doi: 10.1109/TKDE.2008.229. (Year: 2009).*

* cited by examiner

*Primary Examiner* — Adam L Levine
(74) *Attorney, Agent, or Firm* — Fenwick & West LLP

(57) ABSTRACT

A device interfaced with an online system detects, via a physical sensor, item removal and generates a user interface with an alternative option for conversion. Upon receiving a signal from the device indicating the item removal, the online system selects a set of candidate items for replacement of the removed item, wherein each candidate item has a conversion value that is less than a conversion value of the removed item. The online system applies a trained machine-learning model to generate a conversion score for each candidate item that indicates a likelihood of conversion by the user of each candidate item. The online system selects, based on the conversion score for each candidate item, a replacement item from the set of candidate items, and generates a user interface signal that causes a user interface of the device to prompt the user to convert the replacement item.

18 Claims, 5 Drawing Sheets

CART WITH PHYSICAL SENSOR TO DETECT ITEM REMOVAL AND GENERATE USER INTERFACE WITH ALTERNATIVE OPTION

BACKGROUND

Online systems typically offer items for upsell in order to convince their users to add more items to their carts. There are various upsell flows that rely on the online systems presenting additional items for users to put in their carts. The online systems may prompt users in post-checkout flows to add items from their Buy It Again options that the users did not add to their carts. Alternatively, the online systems may recommend other items that are usually converted alongside the items currently in the carts. For example, if a user of the online system is adding bananas to their cart, the online system may prompt the user to add the peanut butter or other fruits that are usually converted alongside bananas. Or, if a user of the online system is buying the laundry detergent, the online system may prompt the user to add the fabric softener too to the cart.

On the other hand, when a user of the online system removes an item from their cart during an online session or a session at a location of a source, the online system has the knowledge that the user was interested in the item but perhaps the item was too expensive. Since the user already has an intent to buy a specific type of item, there may be an opportunity to get the user to convert a lower cost version of the item (i.e., "down-sell" opportunity). However, there is a technical problem of how to detect, in an automatic manner and at a large scale as required by an online system, when this down-sell opportunity occurs, and then how to suggest an appropriate down-sell item for a specific user.

SUMMARY

Embodiments of the present disclosure are directed to using a trained machine-learning model of an online system to generate a user interface displaying an alternative option for conversion based on an interaction of a user of the online system with a physical device (e.g., smart shopping cart). The physical device is equipped with one or more physical sensors to detect item removal and generate a user interface with an alternative option for conversion.

In accordance with one or more aspects of the disclosure, the online system receives, via a network from a device associated with a user of the online system, a signal indicating a removal event associated with an item having a first conversion value, the removal event being a removal of the item in relation to the device. Responsive to receiving the signal, the online system selects, based at least in part on information about the removed item, an initial set of candidate items for replacing the removed item. The online system selects, from the initial set of candidate items, a set of candidate items such that each candidate item from the set of candidate items has a respective second conversion value that is less than the first conversion value. The online system accesses a conversion prediction machine-learning model of the online system, wherein the conversion prediction machine-learning model is trained to identify a likelihood of conversion by the user of each candidate item from the set of candidate items. The online system applies the conversion prediction machine-learning model to the received signal, the information about the removed item, information about each candidate item from the set of candidate items, and information about the user to generate a conversion score for each candidate item that indicates the likelihood of conversion. The online system selects, based at least in part on the conversion score for each candidate item from the set of candidate items, a replacement item from the set of candidate items. The online system generates, using information about the selected replacement item, a user interface signal for generating a user interface of the device. The online system sends the user interface signal to the device, wherein the sending causes the device to display the user interface that prompts the user to convert the selected replacement item.

DETAILED DESCRIPTION

Figure 1:
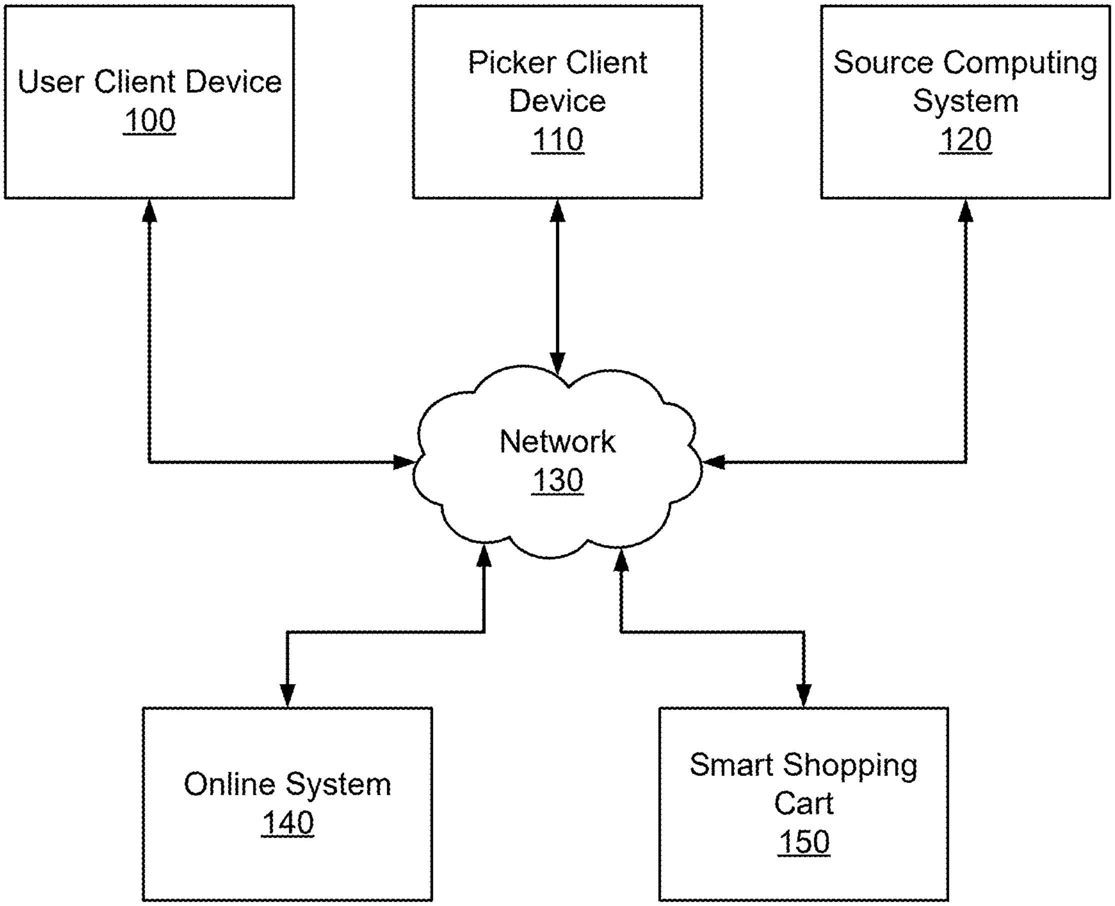
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, an online system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with the smart shopping cart 150 being used by a user to collect items in a source location. For example, the smart shopping cart 150 may display content received from the online system 140 and may receive data describing items that are collected by the user and stored in a storage area of the shopping cart. In some embodiments, the smart shopping cart 150 is a picker client device 110 being operated by a picker collecting items within a source location. Similarly, the smart shopping cart 150 may be operated by a user within the source location collecting items for themselves. Example embodiments of smart shopping carts 150 are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a source location. The user's order may specify which groceries they want to be delivered from the source location and the quantities of each of the groceries. The user client device 100 transmits the user's order to the online system 140 and the online system 140 selects a picker to travel to the source location to collect the groceries ordered by the user. The online system transmits an offer to the picker for the picker to service the order in exchange for consideration and, if the picker accepts the offer, the picker collects the groceries from the source location. Once the picker has collected the groceries ordered by the user, the picker delivers the groceries to a location transmitted to the picker client device 110 by the online system 140.

The online system 140 receives information about a user's interactions with a cart (e.g., the smart shopping cart 150 connected to a computing system, or an online virtual cart). When a user removes an item from a cart that had previously been added, the online system 140 may attempt to "down-sell" the user on a cheaper version of the removed item under the presumption that the user has expressed an interest in the type of item but may have had second thoughts about actually converting the item (e.g., due to a high price of the item). The online system 140 may identify similar (or replacement) items to the removed item and filter those items that are not a "down-sell" version of the removed item. The online system 140 may then apply a trained machine-learning model to information about the removed item and a candidate down-sell item to obtain a conversion score indicating a likelihood that the user would convert the candidate item if suggested. Each candidate item may be then ranked using the conversion score (e.g., according to an expected value computation), and one or more candidate items are selected to be shown to the user with a suggestion to add to the cart.

The online system 140 with the trained machine-learning model presented herein may thus receive an identification of a removed item and output an item to suggest for swapping out with the original item. The item that is recommended may be a down-sell item that would replace an item that was removed from the cart. The online system 140 thus provides down-sell opportunities (or upsell opportunities) for specific items where the specific items are swapped for some other items. This is entirely different from the conventional upsell flows, where online systems try and get the user to add a new item to the cart. The online system 140 presented herein allows for providing a user of the online system 140 with opportunities to swap a given item with another one that is a down-sell item (or an upsell item). For example, if the user adds a branded item of a specific quantity/size (e.g., box of Coca-Cola or Pepsi) to a cart (e.g., the smart shopping cart 150 or the online virtual cart) and then shortly afterwards removes this item from the cart, the online system 140 may prompt the user to down-sell to either a generic item that is a cheaper version of the branded item (e.g., generic cola) or to down-sell to a smaller quantity/size of the same branded item (e.g., smaller package of Coca-Cola or Pepsi). The upselling can work in the same manner just reverse, i.e., the goal of upselling can be to either increase an item quantity or to swap an item with one of a better brand.

The approach presented herein can have various benefits for key constituents of the online system 140. One benefit for a source associated with the online system 140 is an increased gross transaction value (GTV) for cases where the online system 140 down-sell users instead of the users avoiding conversions entirely. Also, the source would feature an increased GTV for any items the online system 140 successfully upsells. The approach presented herein can also benefit consumer packages goods (CPG) entities, as the online system 140 presented herein provides the CPG entities with additional avenues to show ads or provide motivated users with coupons or better offers during upselling. The online system 140 is described in further detail below with regards to FIG. 2.

The smart shopping cart 150 is a physical cart in a source location that enables a user of the online system 140 or a picker associated with the online system 140 to physically add (i.e., place) items from the source location into the smart shopping cart 150 and check the items out from the source location without an involvement of an employee of the source at the point of sale. The smart shopping cart 150 may be connected to the online system 140 via the network 130. During the shopping session, the smart shopping cart 150 may utilize various sensors (e.g., one or more weight sensors, one or more cameras, etc.) to gather visual data about the source location and user's (or picker's) shopping activity, including, but not limited to, a location of the smart shopping cart 150 in the source location, weight changes of the smart shopping cart 150 as items are added to or removed from the smart shopping cart 150, video of the user's (or picker's) activity in and around the smart shopping cart 150, images of items added to the smart shopping cart 150, video and/or images of shelfs in the source location, video and/or images of an entrance/exit of the source location, some other visual inputs from the source location, or some combination thereof. In one or more embodiments, the smart shopping cart 150 is considered being a part of the online system 140. It should be noted that the concepts described herein in relation to the smart shopping cart 150 can be extended and/or applied to other form factors, such as a handheld shopping basket, a handheld receptacle, or some other handheld object that can be used to receive and store shopping items. The smart shopping cart 150 is described in further detail below with regards to FIG. 3.

Figure 2:
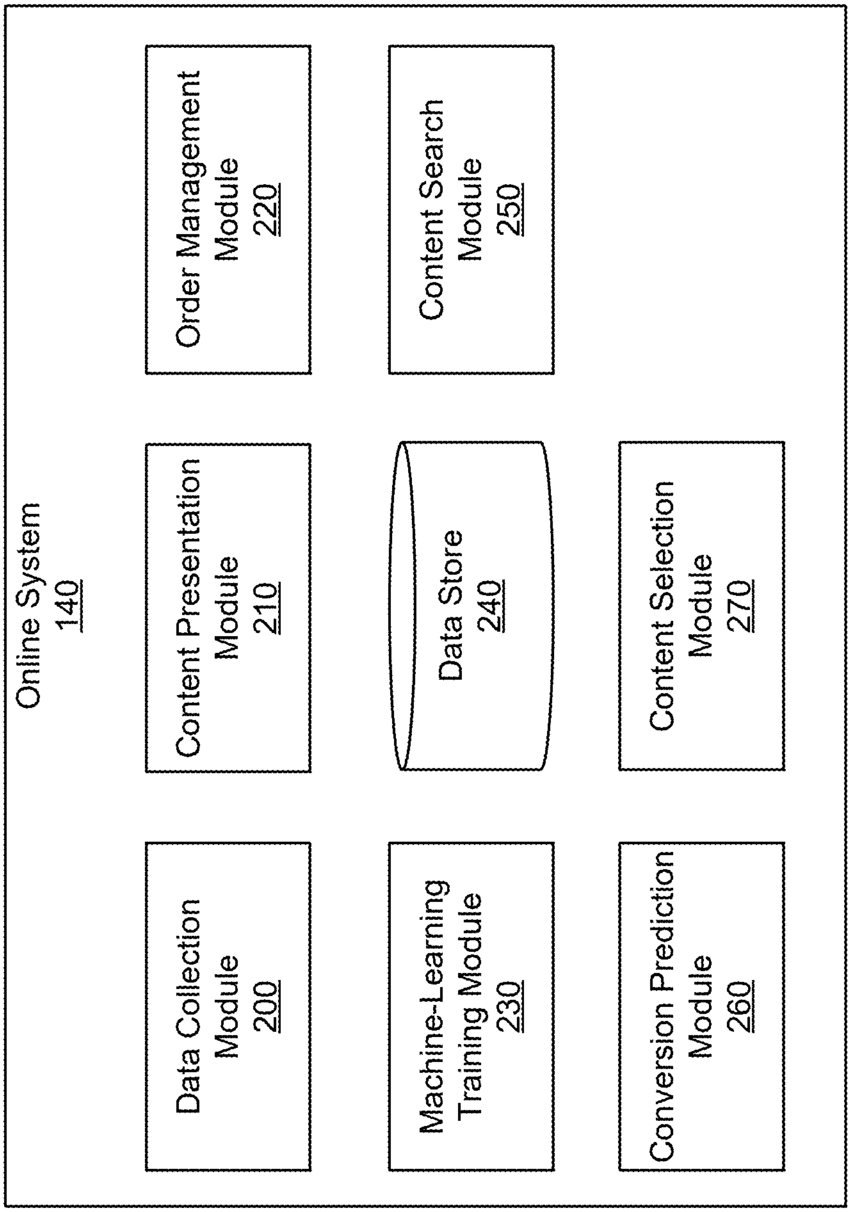
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a content search module 250, a conversion prediction module 260, and a content selection module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The process of identifying one or more candidate items for down-selling to a user of the online system 140 may be triggered when the user removes an item from a cart, e.g., the smart shopping cart 150 or an online virtual cart. The smart shopping cart 150 may detect a removal of the item using cameras or some other sensors. Or a user interface of the user client device 100 may detect a removal of the item from the online virtual cart. The process is triggered by activating the content search module 250.

The content search module 250 may identify a set of candidate items (e.g., set of candidate down-sell items) for potential recommendation to the user for replacement of the removed item. In one or more embodiments, the content search module 250 may access an item replacement model (e.g., machine-learning model) that is trained to identify an initial set of candidate items for replacement of the removed item. The content search module 250 may deploy the item replacement model to run a machine-learning algorithm to output, based on one or more input signals (e.g., features of the removed item, features of candidate items for replacement, etc.), the initial set of candidate items for replacement. A set of parameters for the item replacement model may be stored at one or more non-transitory computer-readable media of the content search module 250. Alternatively, the set of parameters for the item replacement model may be stored at one or more non-transitory computer-readable media of the data store 240.

In one or more other embodiments, the content search module 250 may use item embeddings and apply the nearest neighbor algorithm to identify the initial set of candidate items as a collection of items (e.g., from the data store 240) that are the most similar to the removed item. In such cases, the content search module 250 may first retrieve, from an item catalog database (e.g., at the data store 240) and based on one or more features of the removed item (e.g., a taxonomy node of the removed item), a plurality of candidate items. After that, the content search module 250 may apply the nearest neighbor algorithm to an embedding of the removed item (i.e., item's type, item's brand, item's name, etc.) and embeddings of the retrieved candidate items to identify the initial set of candidate items.

Once the initial set of candidate items are identified, the content search module 250 may filter the initial set of candidate items to generate the set of candidate items that includes only down-sell items. The content search module 250 may compare a price/quantity of each candidate item in the initial set of candidate items to a price/quantity of the removed item to generate the set of candidate items that includes only down-sell items. Alternatively, the content search module 250 may compare a gross merchandise value (GMV) associated with each candidate item in the initial set of candidate items to a GMV of the removed item to generate the set of candidate items that includes only down-sell items.

Figure 3:
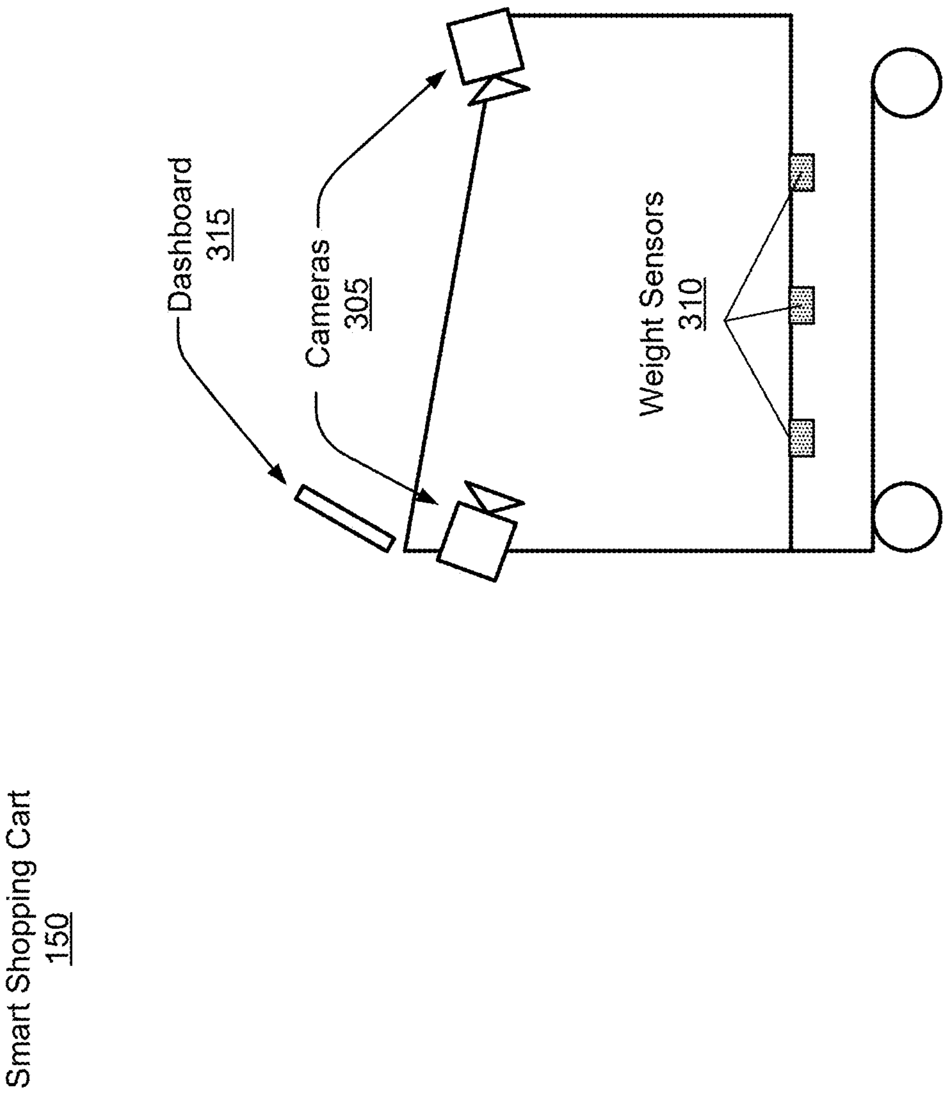
FIG. 3 illustrates an example smart shopping cart associated with an online system, in accordance with one or more embodiments.

FIG. 3 illustrates an example smart shopping cart 150 associated with the online system 140, in accordance with one or more embodiments. The smart shopping cart 150 may have one or more cameras 305 that collect video data and/or image data in relation to shelfs (i.e., aisles in a source location) with various stored items as a user that utilizes the smart shopping cart 150 for shopping in the source location is passing by. The one or more cameras 305 may further collect video data and/or image data in relation to various parts of the source location. The one or more cameras 305 may further collect video data and/or image data in relation to items placed in the smart shopping cart 150, such as a weight of each item as indicated in an item label, a brand of each item, a name of each item, a price of each item, etc. Additionally, the one or more cameras 305 may collect video data and/or image data in relation to actions in and around the smart shopping cart 150, such as a location of the smart shopping cart 150 in the source location when a certain action occurs (e.g., when an item is added to the cart), user's gestures when placing items in the smart shopping cart 150, video and/or images of user's interactions with the smart shopping cart 150, track the location of the user in the source location, measure a velocity of the smart shopping cart 150 in the source location, etc. Alternatively or additionally, the smart shopping cart 150 may be equipped with one or more weight sensors 310 that measure a weight of each item placed in the smart shopping cart 150, as well as a total weight of the smart shopping cart 150 with items placed into a receptacle of the smart shopping cart 150.

The smart shopping cart 150 may further include a dashboard 315 that operates as a user interface that displays a list of items added to a receptacle of the smart shopping cart 150 and can be used for the checkout. The dashboard 315 may be further used for providing notifications to the user that utilizes the smart shopping cart 150. The smart shopping cart 150 may include additional sensors not shown in FIG. 3. The dashboard 315 or some other component of the smart shopping cart 150 may further include a computing system that is in communication, via the network 130, with the user client device 100, the picker client device 110, the source computing system 120, and/or the online system 140. Data with information about the user's interaction(s) with the smart shopping cart 150 gathered by various sensors of the smart shopping cart 150 (e.g., the cameras 305 and/or the weight sensors 310) may be uploaded via the network 130 to the online system 140 and the content search module 250 and the conversion prediction module 260 to be used as input signals for one or more machine-learning models.

The conversion prediction module 260 may access a conversion prediction model (e.g., machine-learning model) that is trained to identify a likelihood of conversion for each candidate item from the set of candidate items identified by the content search module 250. The conversion prediction module 260 may deploy the conversion prediction model to run a machine-learning algorithm to output, based on input signals, a conversion score for each candidate item that indicates the likelihood of conversion for each candidate item. The conversion score may be a value between 0 and 1, where a higher value of the conversion score indicates a higher likelihood of conversion. A set of parameters for the conversion prediction model may be stored at one or more non-transitory computer-readable media of the conversion prediction module 260. Alternatively, the set of parameters for the conversion prediction model may be stored at one or more non-transitory computer-readable media of the data store 240.

In providing the input signals to the conversion prediction model, the conversion prediction module 260 may provide a signal related to an interaction of the user with the smart shopping cart 150 in a source location, such as the signal indicating that the user added an item to the smart shopping cart 150 and then removed the item from the smart shopping cart 150 (e.g., once or multiple times where the item stays removed). The signal related to an interaction of the user with the smart shopping cart 150 may be uploaded from the smart shopping cart 150 to the online system 140 and the conversion prediction module 260 via the network 130.

In providing the input signals to the conversion prediction model, the conversion prediction module 260 may alternatively provide a signal related to an interaction of the user with an online virtual cart via a user interface of the user client device 100, such as the signal indicating that the user added an item to the online virtual cart and then removed the item from the online virtual cart (e.g., once or multiple times where the item stays removed). The signal related to an interaction of the user with the online virtual cart may be communicated from the user client device 100 to the online system 140 and the conversion prediction module 260 via the network 130.

In providing the inputs signals to the conversion prediction model, the conversion prediction module 260 may further provide information about features of the item that was removed from the cart (e.g., either from the smart shopping cart 150 or from the virtual cart), features of each candidate item from the set of candidate items, information about a user's order history, information about a user's price sensitivity, contextual features, some other data that may facilitate identification of a user's likelihood for conversion of each candidate item, or some combination thereof. Note that the contextual features input into the conversion prediction model may include information about any conversion channel that would be utilized for recommending each candidate item to the user, so that a conversion score for each candidate item may be augmented based on a specific conversion channel in which that candidate item would be recommended to the user. The conversion prediction module 260 may retrieve the aforementioned various data from an item catalog database (e.g., stored at the data store 240), a user catalog database (e.g., stored at the data store 240), or identified by a corresponding trained machine-learning model (e.g., the user's price sensitivity).

The content selection module 270 may select a candidate item from the set of candidate items for recommendation to the user. The content selection module 270 may first rank the set of candidate items based at least in part on their conversion scores output by the conversion prediction model for each candidate item from the set of candidate items. In one or more embodiments, the content selection module 270 ranks each candidate item from the set of candidate items using a conversion score that indicates a likelihood of conversion by the user of that candidate item. In one or more other embodiments, the content selection module 270 ranks each candidate item from the set of candidate items using an expected value for each candidate item. The content selection module 270 may calculate the expected value for each candidate item by scaling the conversion score for each candidate item with a GMV for that candidate item. Alternatively, the content selection module 270 may calculate the expected value for each candidate item by scaling the conversion score for each candidate item with a conversion value (i.e., monetary value or price) for that candidate item. In one or more embodiments, when a specific candidate item from the set of candidate items is sponsored by an entity associated with the online system 140 (e.g., CPG entity, brand owner, source, etc.), the content selection module 270 may increase the expected value for the specific candidate item based on a bid amount offered by the entity for conversion of the specific candidate item.

The content selection module 270 may select a candidate item for suggestion to the user based on the ranking, where the selected candidate item may be an item with a highest rank, e.g., a highest conversion score, or highest expected value among the set of candidate items. Based on the selected candidate item, the content presentation module 210 may then generate a user interface signal that is communicated, via the network 130, to the smart shopping cart 150 or the user client device 100. The interface signal may generate a user interface of the smart shopping cart 150 (e.g., the dashboard 315) that displays a message prompting the user to replace an original item (e.g., removed item) with the selected candidate item. Alternatively, the interface signal may generate a user interface of the user client device 100 that displays a message prompting the user to replace an original item (e.g., removed item) with the selected candidate item.

The machine-learning training module 230 may perform initial training of the conversion prediction model using training data. The machine-learning training module 230 may generate the training data based on a number of different data signals. The machine-learning training module 230 may train the conversion prediction model using the training data to generate initial values for the set of parameters of the conversion prediction model.

The data signals used for generating the training data may include replacement data representing a historical set of data with information about what users of the online system 140 have selected as replacements for items in their carts (e.g., smart shopping carts and/or online virtual carts), and what ultimately gets chosen by pickers associated with the online system 140 in case the originally requested item and the replacement item are unavailable or not found in a source location. A higher threshold may be set for emphasizing the specific replacement items, so that the trained conversion prediction model may feature a higher fidelity and result in more universal matches. The replacement data may include taxonomy data (i.e., classification data) to ensure that each candidate item is within a same taxonomy node (i.e., same class) as an original item (e.g., item removed from a cart). The replacement data may further include information about brand and quantity of an original and replacement item so that the online system 140 may determine whether the replacement was a lateral move (e.g., replacement was a same brand, or same quantity, so the replacement should be ignored), or whether the replacement was indeed a down-sell or upsell (e.g., different brand or different quantity). The machine-learning training module 230 may retrieve the replacement data from an item catalog database, e.g., stored at the data store 240.

The data signals used for generating the training data may further include user replacement data with information about activities of users of the online system 140 related to modifications of carts (e.g., smart shopping carts 150 and/or online virtual carts). When users shop online, the online system 140 can gather, from user client devices 100, the user replacement data with information related to removal of items from their online virtual carts, as well as information about replacements of the removed items with other items. Similarly, the online system 140 can upload user replacement data via the network 130 from the smart shopping cart 150, where the uploaded user replacement data may be gathered by sensors (e.g., cameras 305) of the smart shopping carts 150 when users scan certain items only to remove these items from the smart shopping carts 150 and scan other similar items. The user replacement data may also include information about a price sensitivity for each user of the online system 140 whose replacement data are used for training of the conversion prediction model. The machine-learning training module 230 may retrieve the user replacement data from a user catalog database, e.g., stored at the data store 240.

The data signals used for generating the training data may further include user order data with information about order history for a collection of users of the online system 140. The user order data may also include data with information about conversions for the collection of users of Buy It Again items. The machine-learning training module 230 may apply user order data for training of the conversion prediction model so that the trained conversion prediction model can identify whether some of the down-sell options (or upsell options) are those that each user from the collection of users has converted before. In other words, users may be familiar with or unfamiliar with items that are suggested for down-sell (or upsell) of original items.

The data signals used for generating the training data may further include down-sell conversion data (or upsell conversion data), which can be also used for re-training of the conversion prediction model. The down-sell conversion data (or upsell conversion data) may be recorded at user client devices 100 or smart shopping carts 150 and communicated to the online system 140 and the machine-learning training module 230 via the network 130. Note that the down-sell conversion data (or upsell conversion data) may be augmented based on information about specific use cases that were utilized to present down-sell options (or upsell options) to the users.

The machine-learning training module 230 may collect feedback data with information about an interaction of the user with a replacement item that was recommended to the user (e.g., via a user interface of the smart shopping cart 150 or a user interface of the user client device 100). The interaction of the user with the replacement item may be a conversion of the replacement item, viewing details about the replacement item, or ignoring the replacement item. A corresponding interaction signal may be recorded at the smart shopping cart 150 or the user client device 100 and communicated as the feedback data to the online system 140 and the machine-learning training module 230 via the network 130. The machine-learning training module 230 may then re-train the conversion prediction model by updating the set of parameters of the conversion prediction model using the feedback data.

The online system 140 that integrates the trained conversion prediction model may have various use cases. Primarily, the online system 140 with the trained conversion prediction model may be triggered when a user of the online system 140 removes an item from a cart (e.g., the smart shopping cart 150 or an online virtual cart). In such cases, the online system 140 may suggest a down-sell item for replacing the removed item, e.g., at the dashboard 315 of the smart shopping cart 150 or at a cart page of the online virtual cart. In such cases, a lower GMV item may be converted instead of no item at all, which is beneficial for a source associated with the online system 140.

The online system 140 presented herein may suggest a down-sell on a product detail page (PDP) of the item, such as when a user of the online system 140 removes the item from a cart. For example, on the PDP for Gala apples, the online system 140 presented herein may display a down-sell recommendation for the user to replace more expensive organic Fuji apples that the user removed from the cart with less expensive organic Gala apples.

When the online system 140 detects that a user of the online system 140 is removing an item from their smart shopping cart 150, the online system 140 may deploy the trained conversion prediction model to prompt the user with an appropriate down-sell option (e.g., based on the user's price sensitivity). For example, if the user is removing the 24-pack of Tylenol from the smart shopping cart 150, the online system 140 may prompt the user (e.g., by displaying a message at the dashboard 315 of the smart shopping cart 150) to instead add the 24-pack of the source's brand acetaminophen into the smart shopping cart 150. Some other examples are: (i) a down-sell option for the "All Dressed Potato Chips" of Brand A can be the "All Dressed Potato Chips" of Brand B that has a lower price for the same quantity compared to the "All Dressed Potato Chips" of Brand A; (ii) a down-sell option for the 12-pack organic eggs of a specific brand can be the 6-pack organic eggs of the specific brand, which is an item of the same brand and the down-selling is based on a size/quantity.

The online system 140 with the trained conversion prediction model presented herein may also have various upsell applications. For an item that is already in a cart (e.g., the smart shopping cart 150 or an online virtual cart), a brand owner can sponsor a replacement item if added to the cart instead of the original item. On the post-checkout upsell page, the online system 140 may display a call-to-action for any relevant upsells available on the items in the cart. Some of the recommended upsells may be paid by the CPG entity. For example, a user of the online system 140 has already put a generic version of an item (e.g., generic acetaminophen) in their cart. This is an opportunity for a brand owner of a branded item (e.g., branded acetaminophen) to acquire a new user who has just added the generic version of the item to their cart. Alternatively, the user may be just intending to add the generic version of the item to their cart. For example, the user is on the PDP for the generic version of the item (e.g., generic acetaminophen) and the online system 140 then displays a sponsored upsell, which could be accompanied with a coupon or offer from the CPG entity.

Similarly, when a user of the online system 140 employs the smart shopping cart 150 for picking up items in a source location and adding the items to the smart shopping cart 150, the online system 140 may prompt the user by displaying a message on the dashboard 315 offering replacement of one or more items in the smart shopping cart 150 with one or more upsell items. Furthermore, when a user of the online system 140 that uses an in-store mode of an application of the online system 140 goes to a location of a source for items on their previously assembled conversion list, the online system 140 may prompt the user (e.g., via a user interface of the user client device 100) with recommendation of one or more upsell items.

Some additional examples for upsell options are: (i) an upsell option for the "All Dressed Potato Chips" of Brand A can be the "All Dressed Potato Chips" of Brand B that is more expensive than Brand A but having a better popular opinion than Brand A; (ii) an upsell option for Fuji apples can be organic Fuji apples (i.e., pricier but healthier version of the same item); (iii) an upsell option for the 12-pack organic eggs of a specific brand can be the 30-pack organic eggs of the specific brand, which is an item of the same brand and the upselling is based on a size/quantity.

Figure 4:
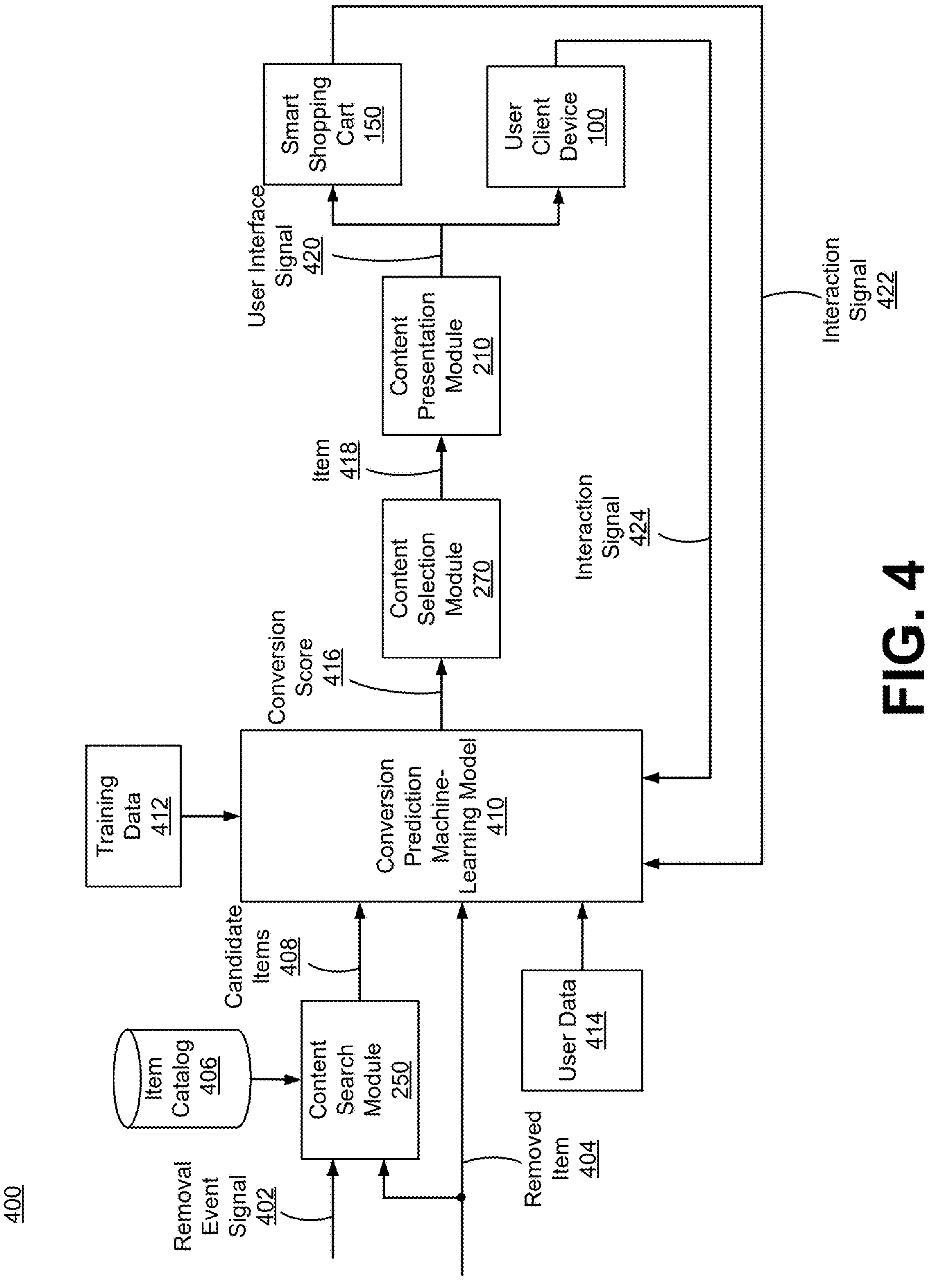
FIG. 4 illustrates an example architectural flow diagram of using a trained machine-learning model of an online system to generate a user interface displaying an alternative option for conversion based on an interaction of a user of the online system with a device associated with the user (e.g., physical cart), in accordance with one or more embodiments.

FIG. 4 illustrates an example architectural flow diagram 400 of using a conversion prediction machine-learning model 410 of the online system 140 to generate a user interface of the online system 140 displaying an alternative option for conversion based on an interaction of a user of the online system 140 with a device associated with the user (e.g., the smart shopping cart 150 or the user client device 100), in accordance with one or more embodiments. The process flow may be initiated by the content search module 250 upon receiving a removal event signal 402. In one or more embodiments, the removal event signal 402 may be communicated via the network 130 to the content search module 250 from the smart shopping cart 150 upon detection (e.g., via cameras 305 of the smart shopping cart 150) that a user of the online system 140 added an item to a physical receptacle of the smart shopping cart 150 and then removed the item from the physical receptacle. In one or more other embodiments, the removal event signal 402 may be communicated via the network 130 to the content search module 250 from the user client device 100 upon detection (e.g., via a user interface of the user client device 100) that the user removed an item from an online virtual cart. In addition to the removal event signal 402, the smart shopping cart 150 or the user client device 100 may communicate, via the network 130, an identification of a removed item 404 to the content search module 250. Alternatively, the identification of removed item 404 may be communicated as a part of the removal event signal 402.

Responsive to the reception of the removal event signal 402, the content search module 250 may identify, based on the identification of the removed item 404 and a set of items retrieved from an item catalog 406 (e.g., stored at the data store 240), a set of candidate items 408 for a potential conversion by the user, wherein each candidate item from the set of candidate items 408 may have a respective second conversion value (e.g., price) that is less than a first conversion value (e.g., price) of the removed item. Thus, the set of candidate items 408 may represent a set of down-sell items. In one or more embodiments, the content search module 250 may apply an item replacement machine-learning model to output an initial set of candidate items. In one or more other embodiments, the content search module 250 may apply the nearest neighbor algorithm to an embedding of the removed item and embeddings of the set of items retrieved from the item catalog 406 to identify an initial set of candidate items. The content search module 250 may filter, based on conversion value of the removed item and each candidate item from the initial set of candidate items, one or more candidate items from the initial set of candidate items to identify the set of candidate items 408. Each candidate item from the set of candidate items 408 may be passed to the conversion prediction machine-learning model 410.

Prior to running a machine-learning algorithm of the conversion prediction machine-learning model 410, the online system 140 may perform (e.g., via the machine-learning training module 230) initial training of the conversion prediction machine-learning model 410 using training data 412 to generate initial values for the set of parameters of the conversion prediction machine-learning model 410. The training data 412 may be generated (e.g., via the machine-learning training module 230) by, e.g., retrieving, from a database of the online system 140 (e.g., the data store 240), replacement data for a collection of users of the online system 140, information about removal events performed by the collection of users, historical order data for the collection of users, some other historical data, or some combination thereof. After the training process is completed, the online system 140 may provide a set of inputs to the conversion prediction machine-learning model 410 (e.g., via the conversion prediction module 260), such as information about each candidate item from the set of candidate items 408, the identification of the removed item 404, and user data 414. Some additional inputs not shown in FIG. 4 suitable for identifying a likelihood of conversion by the user of each candidate item from the set of candidate items 408 may be further provided to the conversion prediction machine-learning model 410.

In providing the set of inputs to the conversion prediction machine-learning model 410, the conversion prediction module 260 may provide information about features of the removed item, such as item type, item name, item brand, item quantity, item size, etc., as well as information about features of each candidate item from the set of candidate items 408, such as item type, item name, item brand, item quantity, item size, etc. The conversion prediction module 260 may retrieve the information about features of the removed item and the information about features of each candidate item from the set of candidate items 408 from, e.g., the item catalog 406.

In providing the set of inputs to the conversion prediction machine-learning model 410, the conversion prediction module 260 may further provide the user data 414 with information about a user's order history, information about a user's price sensitivity, user's contextual features (e.g., information about a user's current conversion channel), some other user related data, or some combination thereof. The conversion prediction module 260 may retrieve the user data 414 from, e.g., a user catalog database stored at the data store 240.

The conversion prediction machine-learning model 410 may apply the machine-learning algorithm to the set of inputs to output a conversion score 416 (e.g., value between 0 and 1) for each candidate item from the set of candidate items 408 that indicates a likelihood of conversion by the user of each candidate item from the set of candidate items 408. The conversion prediction machine-learning model 410 may pass the conversion score 416 for each candidate item from the set of candidate items 408 to the content selection module 270.

The content selection module 270 may select, based at least in part on the conversion score 416 for each candidate item from the set of candidate items 408, an item 418 from the set of candidate items 418. In one or more embodiments, the content selection module 270 identifies the item 418 as an item in the set of candidate items 408 with a highest conversion score 416. In one or more other embodiments, the content selection module 270 identifies the item 418 as an item in the set of candidate items 408 with a highest expected value, where the content selection module 270 computes an expected value for each candidate item from the set of candidate items 408 by scaling the conversion score 416 with a conversion value (e.g., price or GMV) for each candidate item from the set of candidate items 408. The content selection module 270 may pass information about the item 418 (e.g., identification of the item 418) to the content presentation module 210.

Based on the information about the item 418, the content presentation module 210 may generate a user interface signal 420 and communicate, via the network 130, the user interface signal 420 to either the smart shopping cart 150 or the user client device 100. Based on the user interface signal 420, a user interface of the smart shopping cart 150 (e.g., at the dashboard 315) may be generated with a message and information about the item 418 prompting the user to add the item 418 to a physical receptacle of the smart shopping cart 150. Alternatively, based on the user interface signal 420, a user interface of the user client device 100 may be generated with a message and a user interface element, wherein the message may prompt the user to add the item 418 to an online virtual cart by interacting with the user interface element.

The smart shopping cart 150 may record an interaction signal 422 with information about an interaction of the user with the item 418. The interaction may be adding the item 418 to the physical receptacle of the smart shopping cart 150, only viewing the item 418 (e.g., reading labels, price, etc.) in a source location without adding the item 418 to the physical receptacle of the smart shopping cart 150, or fully ignoring the prompt displayed at the user interface of the smart shopping cart 150. The interaction signal 422 may be generated via one or more sensors (e.g., the cameras 305) of the smart shopping cart 150. The online system 140 may receive (e.g., via the machine-learning training module 230) the interaction signal 422 from the smart shopping cart 150 via the network 130. The machine-learning training module 230 may utilize the interaction signal 422 to re-train the conversion prediction machine-learning model 410. By utilizing the interaction signal 422, the machine-learning training module 230 may update the set of parameters of the conversion prediction machine-learning model 410 and continuously improve the machine-learning algorithm of the conversion prediction machine-learning model 410.

Similarly, the user client device 100 may generate and record an interaction signal 424 with information about an interaction of the user with the item 418. The interaction may be adding the item 418 to the online virtual cart, only viewing details about the item 418 (e.g., on the PDP of the item 418), or fully ignoring the prompt displayed at the user interface of the user client device 100. The online system 140 may receive (e.g., via the machine-learning training module 230) the interaction signal 424 from the user client device 100 via the network 130. The machine-learning training module 230 may utilize the interaction signal 424 to re-train the conversion prediction machine-learning model 410. By utilizing the interaction signal 424, the machine-learning training module 230 may update the set of parameters of the conversion prediction machine-learning model 410 and continuously improve the machine-learning algorithm of the conversion prediction machine-learning model 410.

Figure 5:
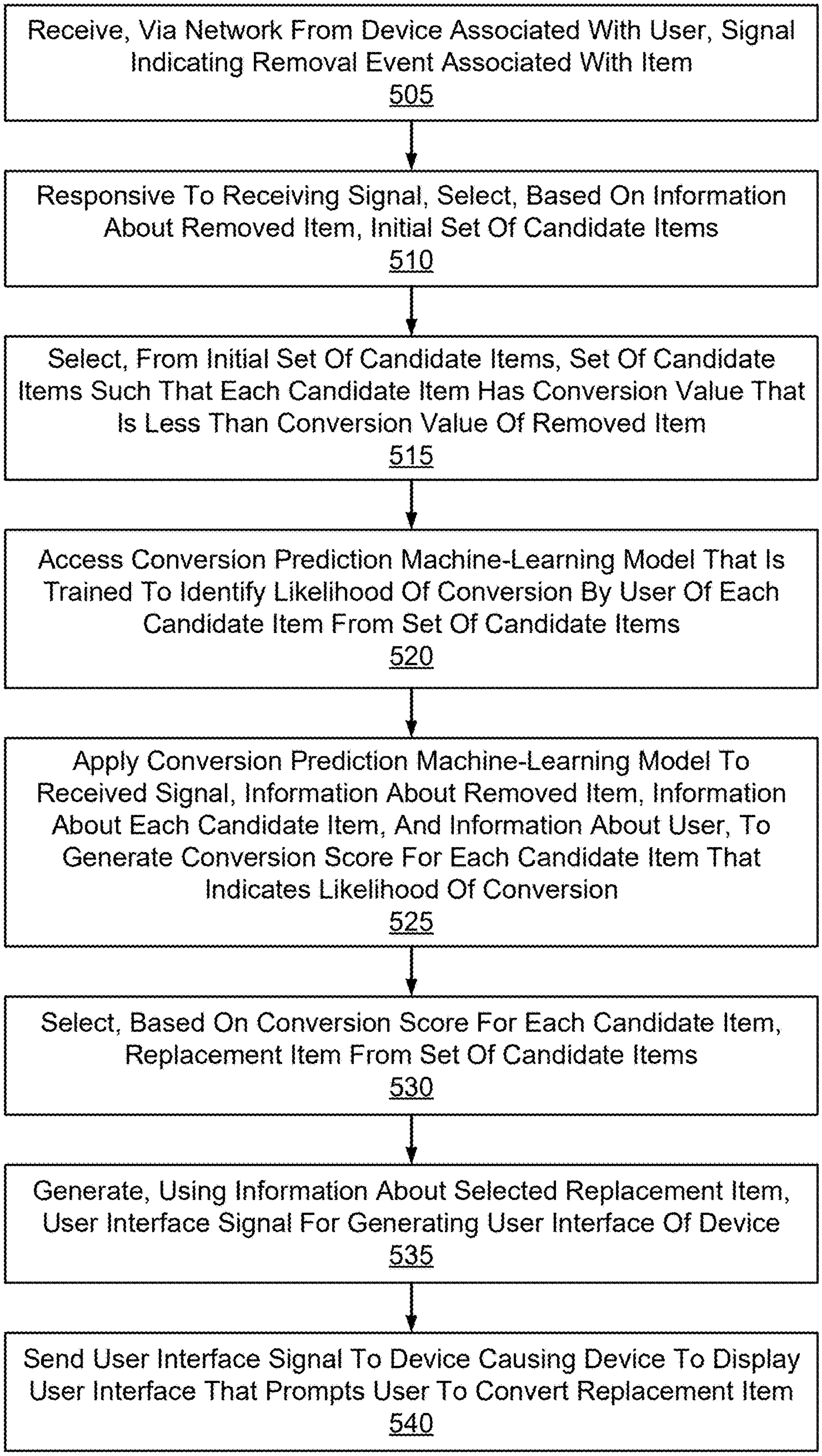
FIG. 5 is a flowchart for a method of using a trained machine-learning model of an online system to generate a user interface displaying an alternative option for conversion based on an interaction of a user of the online system with a device associated with the user (e.g., physical cart), in accordance with one or more embodiments.

FIG. 5 is a flowchart for a method of using a trained machine-learning model of an online system to generate a user interface of the online system 140 displaying an alternative option for conversion based on an interaction of a user of the online system 140 with a device associated with the user (e.g., the smart shopping cart 150 or the user client device 100), in accordance with one or more embodiments. Alternative embodiments may include more, fewer, or different steps from those illustrated in FIG. 5, and the steps may be performed in a different order from that illustrated in FIG. 5. These steps may be performed by an online system (e.g., the online system 140). Additionally, each of these steps may be performed automatically by the online system without human intervention.

The online system 140 receives 505 (e.g., at the content search module 250), via a network (e.g., the network 130) from a device associated with a user of the online system 140 (e.g., the smart shopping cart 150 or the user client device 100), a signal indicating a removal event associated with an item having a first conversion value (e.g., first price), the removal event being a removal of the item in relation to the device.

In one or more embodiments, the online system 140 gathers, via one or more sensors (e.g., cameras 305) mounted to the device, sensor data with an indication that the user added the item to a physical receptacle of the device (e.g., the smart shopping cart 150) which is followed by removing the item from the physical receptacle. In such cases, the online system 140 may detect, by a computing system of the device and based on the gathered sensor data, the removal event associated with the item. The online system 140 may then receive (e.g., at the content search module 250), from the device and via the network, the signal indicating the detected removal event. In one or more other embodiments, the online system 140 receives (e.g., at the content search module 250), from the device and via the network, the signal indicating the removal of a first user interface element associated with the item from a user interface of the device (e.g., user interface of the user client device 100).

Responsive to receiving the signal, the online system 140 selects 510 (e.g., via the content search module 250), based at least in part on information about the removed item, an initial set of candidate items for replacing the removed item. The online system 140 selects 515 (e.g., via the content search module 250), from the initial set of candidate items, a set of candidate items such that each candidate item from the set of candidate items has a respective second conversion value (e.g., second price) that is less than the first conversion value.

The online system 140 may apply an item replacement machine-learning model of the online system 140 (e.g., via the content search module 250) to the received signal and the information about the removed item to generate the initial set of candidate items, wherein the item replacement machine-learning model is trained to identify the initial set of candidate items for replacement of the removed item. The online system 140 may select the set of candidate items by filtering (e.g., via the content search module 250), based at least in part on the first conversion value and a second conversion value of each candidate item from the initial set of candidate items, one or more candidate items from the initial set of candidate items to generate the set of candidate items.

The online system 140 may retrieve (e.g., via the content search module 250), from a database of the online system 140 (e.g., the data store 240) and based on one or more features of the removed item, a plurality of candidate items. The online system 140 may apply (e.g., via the content search module 250) the nearest neighbor algorithm to a first embedding of the removed item and a respective second embedding of each of the plurality of candidate items to identify the initial set of candidate items. The online system 140 may selecting the set of candidate items by filtering (e.g., via the content search module 250), based at least in part on the first conversion value and a second conversion value of each candidate item from the initial set of candidate items, one or more candidate items from the initial set of candidate items to generate the set of candidate items.

The online system 140 accesses 520 a conversion prediction machine-learning model of the online system 140 (e.g., via the conversion prediction module 260), wherein the conversion prediction machine-learning model is trained to identify a likelihood of conversion by the user of each candidate item from the set of candidate items. The online system 140 applies 525 the conversion prediction machine-learning model (e.g., via the conversion prediction module 260) to the received signal, the information about the removed item, information about each candidate item from the set of candidate items, and information about the user to generate a conversion score for each candidate item that indicates the likelihood of conversion.

The online system 140 selects 530 (e.g., via the content selection module 270), based at least in part on the conversion score for each candidate item from the set of candidate items, a replacement item from the set of candidate items. In one or more embodiments, the online system 140 generates (e.g., via the content selection module 270) each expected conversion value of a plurality of expected conversion values for each candidate item from the set of candidate items by at least scaling the conversion score for each candidate item with the respective second conversion value. In such cases, the online system 140 may select (e.g., via the content selection module 270), based at least in part on the plurality of expected conversion values, the replacement item from the set of candidate items. The online system 140 may select the replacement item by identifying (e.g., via the content selection module 270), in the set of candidate items, an item having a highest expected conversion value among the plurality of expected conversion values.

In one or more other embodiments, the online system 140 may adjust (e.g., via the content selection module 270), based on one or more cost values (e.g., bid values) provided (i.e., offered) by an entity (e.g., third-party sponsor, source, etc.) associated with the online system 140 for conversion of one or more candidate items from the set of candidate items, one or more expected conversion values of the plurality of expected conversion values for the one or more candidate items to generate one or more adjusted expected conversion values for the one or more candidate items. In such cases, the online system 140 may select (e.g., via the content selection module 270) the replacement item from the set of candidate items further based on the one or more adjusted expected conversion values.

The online system 140 generates 535 (e.g., via the content presentation module 210), using information about the selected replacement item, a user interface signal for generating a user interface of the device. The online system 140 sends 540 (e.g., via the content presentation module 210) the user interface signal to the device, wherein the sending causes the device to display the user interface that prompts the user to convert the selected replacement item.

The online system 140 may generate (e.g., via the content presentation module 210) the user interface signal that causes the user interface (e.g., at the dashboard 315 of the smart shopping cart 150) to display a message prompting the user to add the replacement item to the physical receptacle of the device. Alternatively, the online system 140 may generate (e.g., via the content presentation module 210) the user interface signal that causes the user interface (e.g., user interface of the user client device 100) to display a message and a second user interface element, the message prompting the user to convert the replacement item by interacting with the second user interface element.

The online system 140 may retrieve (e.g., via the machine-learning training module 230), from a database of the online system 140 (e.g., the data store 240), information about at least one of a plurality of items converted by a plurality of users of the online system 140 instead of an original set of items requested by the plurality of users, removal events performed by the plurality of users, or a set of items (e.g., Buy It Again items) converted by the plurality of users. The online system 140 may generate (e.g., via the machine-learning training module 230) training data based on the retrieved information. The online system 140 may train (e.g., via the machine-learning training module 230), using the training data, the conversion prediction machine-learning model to generate a set of initial values for the set of parameters of the conversion prediction machine-learning model. Additionally, the online system 140 may train (e.g., via the machine-learning training module 230), using the training data, the item replacement machine-learning model to generate a set of initial values for the set of parameters of the item replacement machine-learning model.

The online system 140 may collect (e.g., via the machine-learning training module 230) feedback data with information about an interaction by the user with the replacement item. The interaction may be, e.g., conversion, viewing/clicking on the replacement item without conversion, ignoring the prompt to convert the replacement item, etc. The online system 140 may re-train the conversion prediction machine-learning model by updating (e.g., via the machine-learning training module 230), using the collected feedback data, the set of parameters of the conversion prediction machine-learning model. Additionally, the online system 140 may re-train the item replacement machine-learning model by updating (e.g., via the machine-learning training module 230), using the collected feedback data, the set of parameters of the item replacement machine-learning model.

Embodiments of the present disclosure are directed to the online system 140 that utilizes a trained machine-learning model to generate a user interface of a device associated with a user of the online system 140 (e.g., user interface of the smart shopping cart 150 or a user interface of the user client device 100) that displays an alternative option for conversion (e.g., down-sell option) based on an interaction of user of the online system with the device. The interaction of the user may be an item removal event detected by sensors of the smart shopping cart 150 or via a user interface of the user client device 100.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, the method comprising:

gathering, via one or more cameras and one or more weight sensors of a device associated with a user of the computer system, first sensor data with an indication that the user added a first item to a physical receptacle of the device;

gathering, via the one or more cameras and the one or more weight sensors, second sensor data with an indication that a second item was removed from the physical receptacle;

identifying, by a computing system of the device, using the first sensor data and the second sensor data, that the first item and the second item are a same item, the first sensor data and the second sensor data including visual data of one or more activities of the user in relation to the physical receptacle captured by the one or more cameras and weight data associated with the physical receptacle captured by the one or more weight sensors;

detecting, by the computing system of the device and based on identifying that the first item and the second item are the same item, a removal event associated with the item, the removal event being a removal of the item from the device;

receiving, via a network and from the computing system of the device, a signal indicating the removal event;

responsive to receiving the signal, selecting, using information about the removed item, an initial set of candidate items for replacing the removed item, the removed item having a first conversion value;

selecting, from the initial set of candidate items, a set of candidate items such that each candidate item from the set of candidate items has a respective second conversion value that is less than the first conversion value;

accessing a conversion prediction model of the computer system, wherein the conversion prediction model is a machine-learning model trained to identify a likelihood of conversion by the user of each candidate item from the set of candidate items;

applying the conversion prediction model to the received signal, the information about the removed item, information about each candidate item from the set of candidate items, and information about the user to generate a conversion score for each candidate item that indicates the likelihood of conversion;

selecting, using the conversion score for each candidate item from the set of candidate items, a replacement item from the set of candidate items;

generating, using information about the selected replacement item, a user interface signal for generating a user interface of the device; and sending the user interface signal to the device, wherein sending the user interface signal causes the device to display the user interface that prompts the user to convert the selected replacement item.

2. The method of claim 1, wherein generating the user interface signal comprises:

generating the user interface signal that causes the user interface to display a message prompting the user to add the replacement item to the physical receptacle of the device.

3. The method of claim 1, wherein receiving the signal further comprises:

receiving, from the device and via the network, an indication about a removal of a first user interface element associated with the item from the user interface of the device.

4. The method of claim 3, wherein generating the user interface signal comprises:

generating the user interface signal that causes the user interface to display a message and a second user interface element, the message prompting the user to convert the replacement item by interacting with the second user interface element.

5. The method of claim 1, wherein:

selecting the initial set of candidate items comprises applying an item replacement model to the received signal and the information about the removed item to generate the initial set of candidate items, wherein the item replacement model is a machine-learning model trained to identify the initial set of candidate items for replacement of the removed item; and selecting the set of candidate items comprises filtering, using the first conversion value and a second conversion value of each candidate item from the initial set of candidate items, one or more candidate items from the initial set of candidate items to generate the set of candidate items.

6. The method of claim 1, wherein:

selecting the initial set of candidate items comprises:

retrieving, from a database of the computer system and using one or more features of the removed item, a plurality of candidate items, and applying a nearest neighbor algorithm to a first embedding of the removed item and a respective second embedding of each of the plurality of candidate items to identify the initial set of candidate items; and selecting the set of candidate items comprises filtering, using the first conversion value and a second conversion value of each candidate item from the initial set of candidate items, one or more candidate items from the initial set of candidate items to generate the set of candidate items.

7. The method of claim 1, wherein selecting the replacement item comprises:

generating each expected conversion value of a plurality of expected conversion values for each candidate item from the set of candidate items by at least scaling the conversion score for each candidate item with the respective second conversion value; and selecting, using the plurality of expected conversion values, the replacement item from the set of candidate items.

8. The method of claim 7, wherein selecting the replacement item further comprises:

identifying, in the set of candidate items, an item having a highest expected conversion value among the plurality of expected conversion values.

9. The method of claim 7, further comprising:

adjusting, using one or more cost values provided by an entity associated with the computer system for conversion of one or more candidate items from the set of candidate items, one or more expected conversion values of the plurality of expected conversion values for the one or more candidate items to generate one or more adjusted expected conversion values for the one or more candidate items, wherein selecting the replacement item further comprises selecting, further using the one or more adjusted expected conversion values, the replacement item from the set of candidate items.

10. The method of claim 1, further comprising:

retrieving, from a database of the computer system, information about at least one of a plurality of items converted by a plurality of users of the computer system instead of an original set of items, removal events performed by the plurality of users, or a set of items converted by the plurality of users;

generating training data using the retrieved information; and training, using the training data, the conversion prediction model to generate a set of initial values for a set of parameters of the conversion prediction model.

11. The method of claim 1, further comprising:

collecting feedback data with information about an interaction by the user with the replacement item; and re-training the conversion prediction model by updating, using the collected feedback data, a set of parameters of the conversion prediction model.

12. A computer program product comprising a non-transitory computer readable storage medium having instructions encoded thereon that, when executed by a processor, cause the processor to perform steps comprising:

gathering, via one or more cameras and one or more weight sensors of a device associated with a user of a computer system, first sensor data with an indication that the user added a first item to a physical receptacle of the device;

gathering, via the one or more cameras and the one or more weight sensors, second sensor data with an indication that a second item was removed from the physical receptacle;

identifying, by a computing system of the device, using the first sensor data and the second sensor data, that the first item and the second item are a same item, the first sensor data and the second sensor data including visual data of one or more activities of the user in relation to the physical receptacle captured by the one or more cameras and weight data associated with the physical receptacle captured by the one or more weight sensors;

detecting, by the computing system of the device and based on identifying that the first item and the second item are the same item, a removal event associated with the item, the removal event being a removal of the item from the device;

receiving, via a network and from the computing system of the device, a signal indicating the removal event;

responsive to receiving the signal, selecting, based at least in part on using information about the removed item, an initial set of candidate items for replacing the removed item, the removed item having a first conversion value;

selecting, from the initial set of candidate items, a set of candidate items such that each candidate item from the set of candidate items has a respective second conversion value that is less than a first conversion value;

accessing a conversion prediction model of the computer system, wherein the conversion prediction model is a machine-learning model trained to identify a likelihood of conversion by the user of each candidate item from the set of candidate items;

applying the conversion prediction model to the received signal, the information about the removed item, information about each candidate item from the set of candidate items, and information about the user to generate a conversion score for each candidate item that indicates the likelihood of conversion;

selecting, based at least in part on using the conversion score for each candidate item from the set of candidate items, a replacement item from the set of candidate items;

generating, using information about the selected replacement item, a user interface signal for generating a user interface of the device; and sending the user interface signal to the device, wherein sending the user interface signal causes the device to display the user interface that prompts the user to convert the selected replacement item.

13. The computer program product of claim 12, wherein the instructions further cause the processor to perform steps comprising:

generating the user interface signal that causes the user interface to display a message prompting the user to add the replacement item to the physical receptacle of the device.

14. The computer program product of claim 12, wherein the instructions further cause the processor to perform steps comprising:

receiving, from the device and via the network, an indication about a removal of a first user interface element associated with the item from the user interface of the device; and generating the user interface signal that causes the user interface to display a message and a second user interface element, the message prompting the user to convert the replacement item by interacting with the second user interface element.

15. The computer program product of claim 12, wherein the instructions further cause the processor to perform steps comprising:

selecting the initial set of candidate items by applying an item replacement model of the computer system to the received signal and the information about the removed item to generate the initial set of candidate items, wherein the item replacement model is a machine-learning model trained to identify the initial set of candidate items for replacement of the removed item; and selecting the set of candidate items by filtering, using the first conversion value and a second conversion value of each candidate item from the initial set of candidate items, one or more candidate items from the initial set of candidate items to generate the set of candidate items.

16. The computer program product of claim 12, wherein the instructions further cause the processor to perform steps comprising:

generating each expected conversion value of a plurality of expected conversion values for each candidate item from the set of candidate items by at least scaling the conversion score for each candidate item with the respective second conversion value; and selecting the replacement item by identifying, in the set of candidate items, an item having a highest expected conversion value among the plurality of expected conversion values.

17. The computer program product of claim 12, wherein the instructions further cause the processor to perform steps comprising:

retrieving, from a database of the computer system, information about at least one of a plurality of items converted by a plurality of users of the computer system instead of an original set of items, removal events performed by the plurality of users, or a set of items converted by the plurality of users;

generating training data using the retrieved information;

training, using the training data, the conversion prediction model to generate a set of initial values for a set of parameters of the conversion prediction model;

collecting feedback data with information about an interaction by the user with the replacement item; and re-training the conversion prediction model by updating, using the collected feedback data, the set of parameters of the conversion prediction model.

18. A computer system comprising:

a processor; and a non-transitory computer-readable storage medium having instructions that, when executed by the processor, cause the computer system to perform steps comprising:

gathering, via one or more cameras and one or more weight sensors of a device associated with a user of the computer system, first sensor data with an indication that the user added a first item to a physical receptacle of the device;

gathering, via the one or more cameras and the one or more weight sensors, second sensor data with an indication that a second item was removed from the physical receptacle;

identifying, by a computing system of the device, using the first sensor data and the second sensor data, that the first item and the second item are a same item, the first sensor data and the second sensor data including visual data of one or more activities of the user in relation to the physical receptacle captured by the one or more cameras and weight data associated with the physical receptacle captured by the one or more weight sensors;

detecting, by the computing system of the device and based on identifying that the first item and the second item are the same item, a removal event associated with the item, the removal event being a removal of the item from the device;

receiving, via a network and from the computing system of the device, a signal indicating the removal event;

responsive to receiving the signal, selecting, using information about the removed item, an initial set of candidate items for replacing the removed item, the removed item having a first conversion value;

selecting, from the initial set of candidate items, a set of candidate items such that each candidate item from the set of candidate items has a respective second conversion value that is less than a first conversion value;

accessing a conversion prediction model of the computer system, wherein the conversion prediction model is a machine-learning model trained to identify a likelihood of conversion by the user of each candidate item from the set of candidate items;

applying the conversion prediction model to the received signal, the information about the removed item, information about each candidate item from the set of candidate items, and information about the user to generate a conversion score for each candidate item that indicates the likelihood of conversion;

selecting, using the conversion score for each candidate item from the set of candidate items, a replacement item from the set of candidate items;

generating, using information about the selected replacement item, a user interface signal for generating a user interface of the device; and sending the user interface signal to the device, wherein sending the user interface signal causes the device to display the user interface that prompts the user to convert the selected replacement item.

* * * * *